US006433980B1

(12) United States Patent
Tsutada et al.

(10) Patent No.: US 6,433,980 B1
(45) **Date of Patent: *Aug. 13, 2002**

(54) CONTROLLED SWITCHING DEVICE

(75) Inventors: Hiroyuki Tsutada; Takashi Hirai, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/532,010

(22) Filed: Mar. 21, 2000

(30) Foreign Application Priority Data

Nov. 4, 1999 (JP) .......................................... 11-313653

(51) Int. Cl.[7] ................................................ H02H 3/18

(52) U.S. Cl. ........................................................ 361/83

(58) Field of Search ............................. 361/79, 83, 85, 361/87, 89

(56) References Cited

U.S. PATENT DOCUMENTS 5,282,125 A * 1/1994 Dhyanchand et al. ......... 363/49
5,793,594 A * 8/1998 Niemira et al. ............... 361/93
6,172,863 B1 * 1/2001 Ito et al. ........................ 361/79

* cited by examiner

*Primary Examiner*—Edward H. Tso
*Assistant Examiner*—Pia Tibbits
(74) *Attorney, Agent, or Firm*—Leydig, Voit & Mayer, Ltd.

(57) ABSTRACT

A close control signal or an open control signal is outputted after a wait time of a half cycle or less upon a close command or an open command to a breaker in order to make a breaker at a predetermined interpole voltage phase or to open a main circuit current at a predetermined phase. When the close command or the open command is detected, a delay time is determined based on latest zero point time and a predicted close time or a predicted open time, and the close control signal or the open control signal is outputted after a lapse of the delay time so as to make or to open a pole at the predetermined phase of the interpole voltage or the main circuit current.

11 Claims, 7 Drawing Sheets

CONTROLLED SWITCHING DEVICE

BACKGROUND OF THE INVENTION

1. Field of the Invention

The present invention relates to a controlled switching device for controlling open and close timing of a breaker and for preventing a harmful phenomenon for a system and an apparatus from occurring, in particular, to a structure of a control device for the controlled switching device.

2. Discussion of Background

Japanese Unexamined Patent Publication JP-A-3-156820 discloses a controlled switching device, which does not generate a transitional phenomenon influencing systems and apparatuses regardless of a make break condition. In such a controlled switching device, a device for controlling timing of opening a pole is provided in a breaker so that contacts are sufficiently spaced at time of cutting off a current. Further, the device for controlling the timing of opening the pole controls timing of closing the pole in the breaker in response to a type of a load.

Japanese Unexamined Patent Publication JP-A-6-20564 discloses an open control device for a breaker used as a shunt reactor, in which a pole is opened without reigniting. In the open control device for the breaker, because a high frequency reignition surge generated at time of opening the pole of shunt reactor does not exist when a final breaking point of the breaker is a current phase zero point, a single-phase voltage is inputted into the control device from an instrument transformer. In the control device, each current phase is calculated based on a phase of the single-phase voltage and outputs a command of opening the pole to the breaker so that a current, which flows through the shunt reactor, is cut off at a current zero point of each phase.

In the above-mentioned control devices, a control signal is outputted to control close timing or open timing by detecting a zero point of a current or a voltage of a main circuit after a close command or an open command is input and by changing a time for urging a releasing device or the device for controlling to close the pole based on the detected zero point. Therefore, it is necessary to wait for the time from inputting the close command or the opening command until detecting the next voltage zero point or the next current zero point. Resultantly, there is a problem that a dead time of a maximum of one cycle occurs between the input of the closing command or the opening command and the corresponding actuation of the switch.

Further, an operating time of the breaker is corrected by a correction curve of a control voltage expressed by a primary expression or a secondly expression, and the breaker does not have a function of dealing with a displacement of the acting time by an environmental temperature change, that between devices, that between phases, that caused by aged deterioration, and so on. Therefore, there is a problem that a function of constantly closing or opening the pole at predetermined timing is hardly realized.

Further, there is a problem that the zero point is not accurately detected when a sudden noise of an impulse type or a higher harmonic is superposed on a detection signal when the zero point of the current or the voltage is detected. Also, there is a problem that the pole is not closed or opened at a predetermined time when a frequency varies because the control device does not respond to frequency variation of the voltage or the current.

SUMMARY OF THE INVENTION

It is an object of the present invention to solve the above-mentioned problems inherent in the conventional technique and to provide a controlled switching device, which outputs a close control signal or an open control signal after latency of a half cycle or less with respect to a close command or an open command when a pole is closed or opened at predetermined timing with respect to the close command or the open command and can make a breaker at a predetermined interpole voltage phase or can open the pole at a predetermined phase of a main open current.

According to a first aspect of the present invention, there is provided a controlled switching device comprising a control device which acquires a zero interpole voltage time of a breaker preceeding and closest to a close command, a close command detection time from the zero interpole voltage time to a detection of the close command, a predicted closing time from an output of a close control signal to a close of a pole, and a pre-arc time from making to closing the pole based on a target phase, acquires close control latency on a premise that it is possible to make at a target phase by outputting the close control signal after a lapse of the close command detection time and the close control latency of less than a half period of an interpole voltage from the zero interpole voltage time, and outputs the close control signal after a lapse of the close control latency from the detection of the close command.

According to a second aspect of the present invention, there is provided the controlled switching device according to the first aspect of the invention, wherein continuous evaluated zero point times as much as a predetermined number preceeding and closest to the close command are used as the zero interpole voltage time; a minimum deviation of latency between one of the evaluated zero point times and the other evaluated zero point times from products of a half period of the breaker interpole voltage and integers is acquired; the zero interpole voltage time is rendered to be a time after a lapse of times as much as a product of a half period and integers from one of the evaluated zero point times closest to a detection time of the close command just before detecting the close command, wherein the one is selected from the evaluated zero point times having a minimum sum of absolute values of the minimum deviations.

According to third aspect of the present invention, there is provided the controlled switching device according to the first aspect of the invention, wherein the predicted close time is acquired by correcting a reference close time under a standard environmental condition by a close time correction table based on an environmental condition.

According to a fourth aspect of the predict invention, there is provided the power make brake device according to the first aspect of the invention, wherein an observation close time is acquired from a contact time of a contact at a close operation, which is detected by a close time detection means interlocked with a movable contact and an output time of the close control signal; and a reference close time is corrected by a close time correction table based on an environmental condition.

According to a fifth aspect of the present invention, there is provided the controlled switching device according to the first aspect of the invention, wherein an observation close time is obtained by detecting a rise time of a main circuit current at time of closing and adding a pre-arc time to latency of the rise time from an output of the close control signal; and a reference close time is corrected by a close time correction table based on an environmental condition.

According to a sixth aspect of present invention, there is provided the controlled switching device according to the first aspect of the invention, wherein continuous zero point times as much as a predetermined number preceeding and closest to the close command are used to acquire local frequencies of the breaker interpole voltage from a frequency between adjacent zero point times, and a frequency of the breaker interpole voltage is an average of the local frequencies.

According to a seventh aspect of present invention, there is provided the controlled switching device comprising a control device, which acquires a main circuit current zero point time, an open command detection time between the main circuit current zero point time and detection of the open command, and a predicted open time between an output of an open control signal and an open of a pole, acquires an open control delaying time on a premise that the pole is opened at a target phase when the open control signal is outputted after a lapse of the open command detection time and an open control delaying time of a half phase or less of a main circuit current from the main circuit current zero point time, and outputs the open control signal after the open control delay time from a detection of an open command.

According to an eighth aspect of present invention, there is provided the controlled switching device according to the seventh aspect of the invention, wherein continuous evaluated zero point times as much as a predetermined number preceeding and closest to the open command is used as the main circuit current zero point time; a minimum deviation of latency between each of the evaluated zero point times and the other evaluated zero point times from products of a half period of the main circuit current and integers; and the zero point time is a time preceeding the detection of the open command and after a lapse of a power of the half period from one of the evaluated zero point times closest to a time of the detection of the open command among the evaluated zero point times, in which a sum of absolute values of the minimum deviations is minimum.

According to an ninth aspect of present invention, there is provided the power make break switch according to the seventh aspect of the invention, wherein a predicted open time is obtained by correcting a reference open time by an open time correction table under a reference environmental condition based on an environmental condition.

According to a tenth aspect of present invention, there is provided the controlled switching device according to the seventh aspect of the invention, wherein the open time at time of opening a pole is detected by an open time detection means interlocked with a movable contact; an observation open time is acquired from an output time of the open control signal; and a reference open time is corrected by an open time correction table based on an environmental condition.

According to an eleventh aspect of present invention, there is provided the controlled switching device according to the seventh aspect of the invention, wherein the continuous main circuit current zero point times as much as a predetermined number preceeding and closest to the open command are used to obtain a local frequency of a main circuit current from latency between adjacent main circuit current zero point times; and a frequency of the main circuit current is rendered to be an average of the local frequencies.

BRIEF DESCRIPTION OF THE DRAWINGS

A more complete appreciation of the invention and main of the attendant advantage thereof will be readily obtained as the same becomes better understood by reference to the following detail description when considered in connection with the accompanying drawings, wherein:

FIG. 4(*b*) illustrates a correction table concerning an operating time;

DETAILED DESCRIPTION OF THE PREFERRED EMBODIMENTS

A detailed explanation will be given of preferred embodiments of the present invention in reference to FIGS. 1 through 8 as follows, wherein the same references are used for the same or similar portions and description of these portions is omitted.

Embodiment 1

Hereinbelow, a controlled switching device, to which the present invention is applied, will be described in reference of figures. Terminology is based on JISC4603 concerning high voltage a.c. current breaker unless otherwise described. However, a scope of the invention is not limited to a content of JISC4603.

Figure 1:
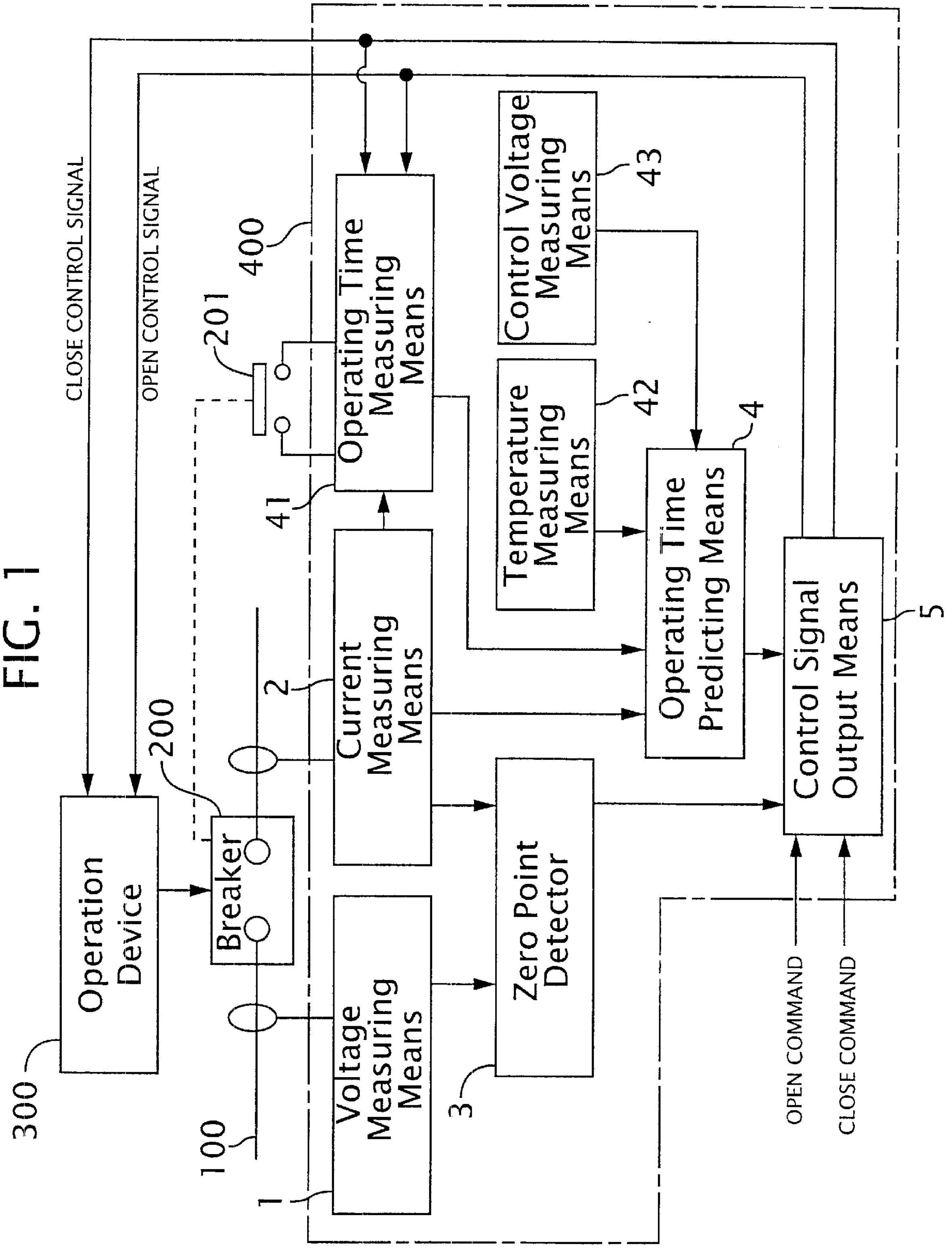
FIG. 1 is a block diagram of a controlled switching device according to Embodiment 1 of the present invention.

FIG. 1 is a block chart of a controlled switching device according to Embodiment 1 of the present invention. In FIG. 1, numerical reference 100 designates a main circuit, numerical reference 200 designates a breaker connected to the main circuit 100, numerical reference 300 designates an operation device, and numerical reference 400 designates a control device.

Numerical reference 1 designates an interpole voltage measuring means for detecting an interpole voltage of the breaker 200, numerical reference 2 designates a main circuit current measuring means for detecting a current of the main circuit 100. Numerical reference 3 designates a zero point detection means, which acquires zero point times of the interpole voltage and a main circuit current from a voltage signal and a current signal, which are detected by the interpole voltage measuring means 1 and the main circuit current measuring means 2, and constantly memorizes the latest zero point times of the interpole voltage and the main circuit current. Numerical reference 4 designates an operating time predicting means for predicting a close time point or an open time point of the breaker 200. Numerical reference 5 designates a control signal output means, which determines a delay based on the latest zero point time, memorized in the zero point detection means 3, and a predicted close time or a predicted open time, both of which are obtained by the acting time prediction means 4, and outputs a close control signal or an opening control signal, by which a close control device or a tripping device is actuated, after a lapse of the delay.

The terminology "make" means that current starts to flow through the main circuit in a close operation. Further, the discharge generated between contacts of the breaker depends on an absolute value of a voltage applied between the contacts, and the "phase" is measured from a position after one-half cycle from a starting point, being zero point of voltage and current.

Numerical reference 41 designates an operating time measuring means which acquires an observed close time extending from an output of the close control signal during operation to a time when the poles are in contact or an observed open time from an output of the open control signal to a time when the pole is opened, based on an operating time of an auxiliary switch 201 acting synchronously with a contacted state when the pole is closed and an open state of the pole under an opening operation, wherein the acting time measuring means is interlocked with a movable contact. Further, although an auxiliary switch is used as the acting time measuring means 41, it is also possible to provide a rotation angle measuring means, such as a rotary encoder, in a rotation shaft for driving the movable contact of the breaker 200 and to acquire the observed close time and the observed open time, depending on a positional signal of the movable contact. The positional signal is obtained by the rotation angle measuring means. Further, operation of a working part of the breaker is easily monitored by providing the rotation angle measuring means.

Numerical reference 42 designates an environmental temperature measuring means, which measures an environmental temperature around the breaker 200. Numerical reference 43 designates a control voltage measuring means which measures a control voltage, wherein a terminology "control voltage" contains a meaning of an operation voltage.

An acting time predicting means 4 corrects a reference close time and a reference open time, both of which are acting times under a reference environmental condition of the breaker 200 and acquires a predicted close time or a predicted open time based on an environmental condition, the reference close time and the reference open time.

Figure 2:
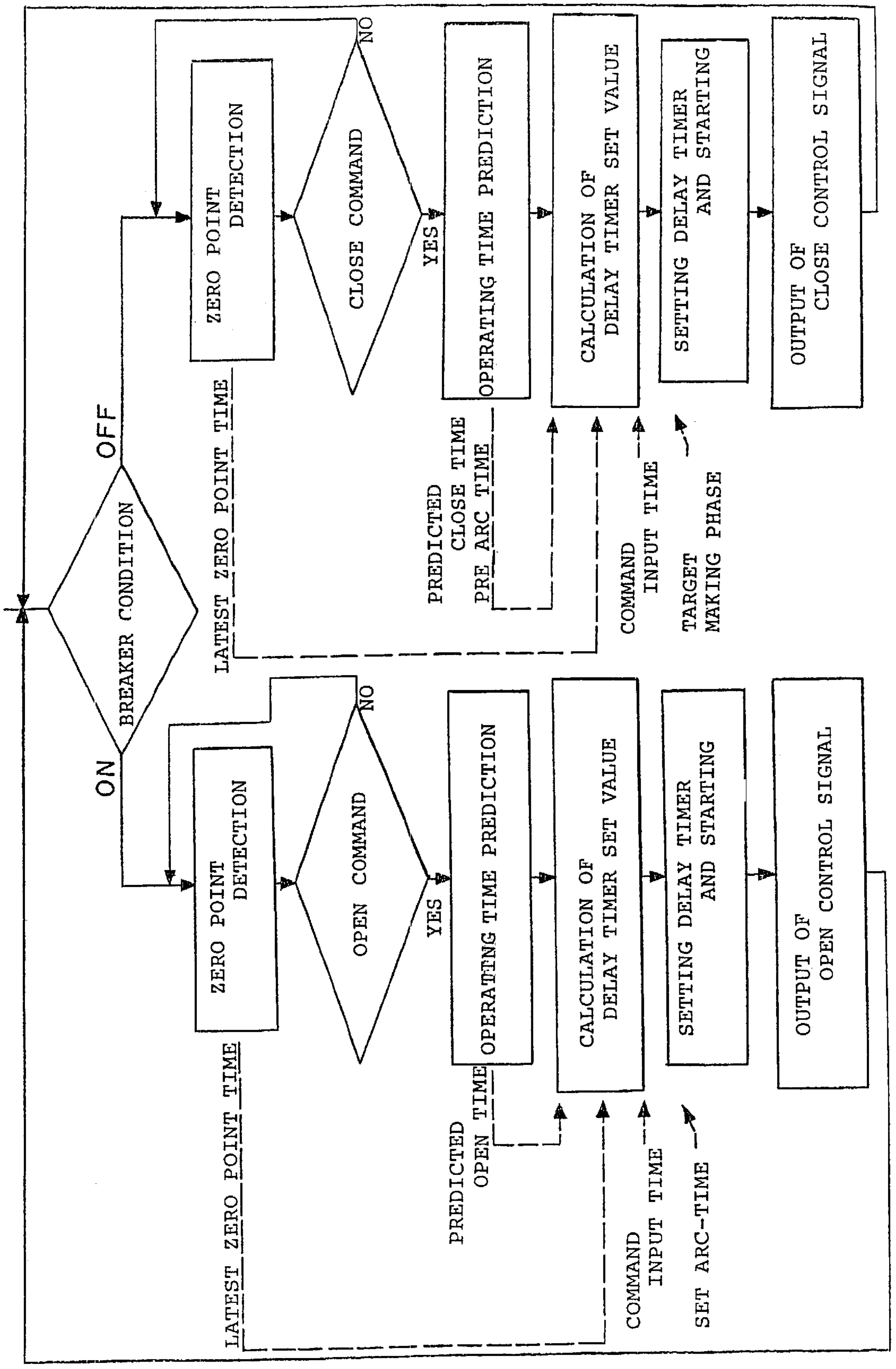
FIG. 2 is a flow chart explaining an entire operation of the controlled switching device according to Embodiment 1 of the present invention.

FIG. 2 is a flow chart explaining an entire operation of the controlled switching device. Significance of parts of the flow chart will be described.

The interpole voltage measuring means 1 and the main circuit current measuring means 2 sequentially digitize an analog signal from a power transformer (PT) and a current transformer (CT), both of which are located in the main circuit 100, using an A/D converter at predetermined sampling intervals, whereby a voltage signal and a current signal, both as digital data, are acquired. Hereinbelow, the voltage signal and the current signal are digital signals unless otherwise described. When harmonic noise is superposed on an analog signal, detection accuracy of the zero point detection means 3 deteriorates. Therefore, a low-pass filter may be inserted ahead the A/D converter for removing the harmonic noise. Further, the voltage signal or the current signal may be smoothed. For example, by providing a central value filter for filtering representative values ahead and behind a central value of data subjected to treatment, it is possible to remove noise shaped like a needle in the data. Further, by constructing a low pass filter using the digital filter, harmonic noise which exceeds the frequency of the main circuit, can be removed from the voltage signal or the current signal.

In the zero point detection means 3, the zero point time of the voltage or the current is acquired from the voltage signal, the current signal, and measured periods of these signals when a sign of the voltage signal or the current signal changes from the negative to the positive or from the positive to the negative. The zero point time is determined by:

$$t_0=t_1+|S\cdot A_1/(A_1+A_2)|$$

where symbol $t_1$ represents a final sampling time before the change; symbol $A_1$ represents a value at the final sampling time before the change; symbol $A_2$ represents an initial sampling value after the change; and symbol S represents a sampling interval.

Thus acquired zero point times to respectively for the voltage signal and the current signal are memorized in predetermined memories. Needless to say that the zero point times may be detected by a zero-crossing detector.

It is desirable that one with a highest reliability out of thus acquired plurality of zero point times, which are preceeding and closest, in order to acquire a zero point time, which is a standard of an accurate operation of the breaker and by which an influence of a high harmonic noise and so on is removed from the voltage signal or the current signal. Hereinbelow, such usage is named a zero point evaluation process. An operation of the zero point evaluation process will be described.

Figure 3:
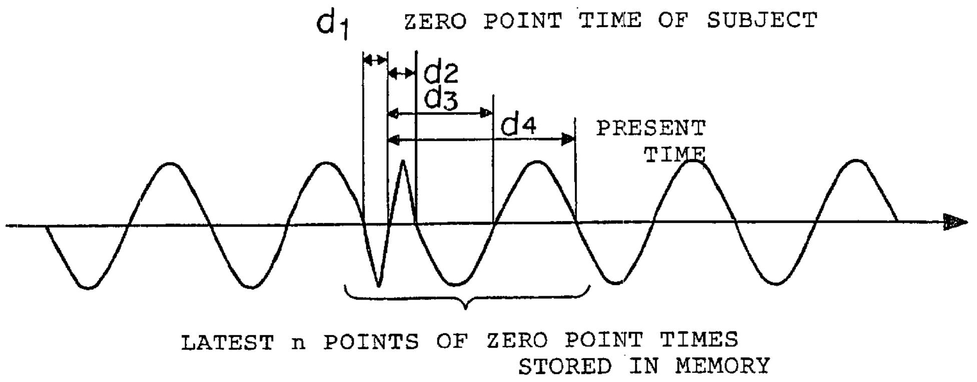
FIG. 3 is a time chart explaining a zero point evaluation process.

FIG. 3 explains a method of the zero time point evaluation process. A time point when the zero point is evaluated is referred to as a present time point. Points as much as n preceding and closest to the zero point, for example, 5 points, are stored in a memory. The difference between an arbitrary pair of two points is calculated for each of the n zero time points. Although differences of $d_1$ through $d_{n-1}$ between one of the zero time points and the other zero time points of as much as (n−1) are obtained, every difference should be a multiple integer of a half period of the interpole voltage of one-half of a period of the main circuit current. The half of the period is simply referred to as a half period, and a half cycle after a starting point of the zero point of the voltage and the current. However, deviations of delay between the zero time points from multiple integers of a half period occur due to a frequency variation of the system frequency, phase variation accompanied by a load variation, and the existence of a high harmonic. In the zero point evaluation in the controlled switching device, a zero time point preceding the present time point when an integer multiple of a half cycle passes after the zero point closest to the present time point is acquired from the zero time points, a sum of absolute values of the deviations is minimized, and the acquired zero time point preceding the present time is used as an acting reference zero point time. The following zero time point just before the close command or the open command may be used without the zero point evaluation process. Hereinbelow, the zero time points, acquired by conducting the zero point evaluation process just before the close command or the open command, and the zero time point just before the close command or the open command, are each referred to as a reference zero point.

As described, because the reference zero time point is detected, it is possible to acquire an accurate zero point of the interpole voltage and an accurate zero point of the main circuit current.

An operation of the acting time prediction means 4 will be described.

Figure 4:
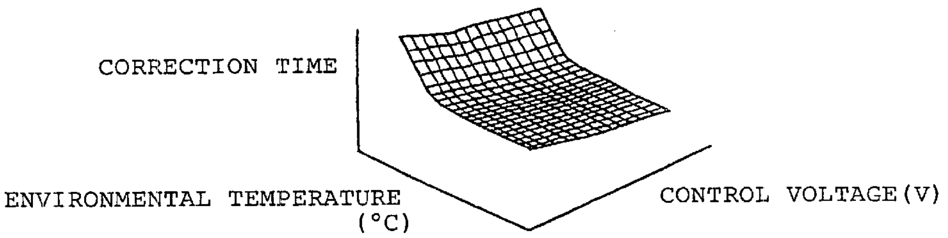
FIG. 4(*a*) illustrates a correction table concerning an operating time.
Figure 4:
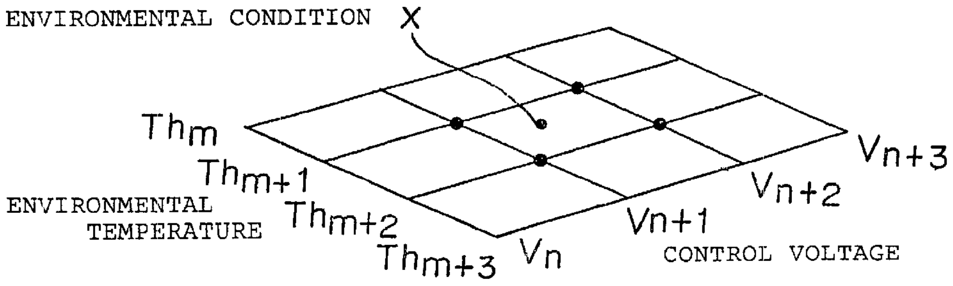

As for the breaker 200, the close time and the open time under the reference environmental conditions, such as an environmental temperature and a control voltage, hereinbelow respectively referred to as a basic close time and a basic open time, and variation characteristics of the close time and the open time along with a change of the environmental condition are acquired and stored in the acting time prediction means 4 respectively as a basic close time table, a basic open time table, a close time correction table, and an open time correction table. A schematic structure of the correction tables is illustrated in FIGS. 4(*a*) and 4(*b*). FIG. 4(*a*) illustrates an entire structure of the correction tables. FIG. 4(*b*) illustrates a detail of the correction tables for calculating a correction under a certain environmental condition.

Such correction data are almost common to controlled switching devices of the same type because the controlled switching devices of the same type have common characteristics.

In the acting time prediction means 4, an estimated reference close time and an estimated reference open time, respectively values of the close time and the open time under the reference environmental condition, are acquired from the observed close time, the observed open time and the environmental condition at an operating time, respectively acquired by the acting time measuring means 41, the environmental temperature measuring means 42, and the control voltage measuring means 43. A combination of the reference close time and the close time correction table, or a combination of the reference open time and the open time correction table, and the reference close time and the reference open time are corrected by the estimated reference close time and the estimated reference open time. The predicted close time and the predicted open time are obtained in real time based on the corrected reference close time and the corrected reference open time, inputs from the acting time measuring means 41, the environmental temperature measuring means 42, the control voltage measuring means 43, and the close time correction table or the open time correction table.

Incidentally, the reference close time and the reference open time serve as prediction references of the close time and the open time under the reference environmental condition and obtained from time series data of the estimated reference close time and the estimated reference open time until the past acting time based on the basic close time and the basic open time. A process of obtaining the reference close time and the reference open time will be described in a latter part of this specification.

Time correction data under an environmental condition X has a correction amount, obtained from environmental temperatures from four points adjacent to the environmental condition X, and time correction data corresponding to the control voltage, by bidirectional first order interpolation.

It is possible to accurately predict the close time and the open time of the breaker 200 by correcting the close time and the open time of the breaker 200 in response to the environmental condition.

The reference close time and the reference open time are corrected by properly weighting each of the estimated reference close times and each of the estimated reference open times at acting times of the past n times, for example 10 times. In other words, the estimated reference close times and the estimated reference open times are respectively multiplied by the n weight coefficients, properly selected so that a sum of these becomes 1, and the results are added to serve as a new reference close time and a new reference open time. It is desirable that weight coefficients for closer data are made large in order to enhance response to evaluations of the reference close time and the reference open time. Incidentally, at a time of starting to use the device, the basic close time is used as the reference close time and the estimated reference close time, and the basic open time is used as the reference open time and the estimated reference open time. When differences between the estimated reference close time and the reference close time and between the estimated reference open time and the reference open time are large, for example, ±2 msec or more, it is preferable to omit such an estimated reference close time and such an estimated reference open time from subjects for the correction.

The correction of the reference close time and the reference open time is effective for aged deterioration of an operating time caused by mechanical wear. Progress of abrupt wear and so on of a sliding portion of a make break mechanism may be detected based on deviations between the estimated reference close time and the reference close time and between the estimated reference open time and the reference open time or deviations between the estimated reference close time and a prior estimated reference close time and between the estimated reference open time and a prior estimated reference open time.

When changes of the close time and the open time along with the change of the environmental condition can be practically ignored, the above correction is not conducted, and average values of the close times or of the open times respectively in a plurality of close operations or a plurality of open operations may be used respectively as the predicted close time and the predicted open time.

Although correction of variations of the close time and the open time with changes of the environmental conditions based on the environmental temperature and the control voltage have been described, in a controlled switching device of an indirect operation type using compressed air or hydraulic oil as an operation medium, the close time and the open time may be corrected based on changes of temperature and pressure of the operation medium.

When the control signal output means 5 detects the close command or the open command, based on a detection time of the close command or the open command, the reference zero point, and the predicted close time point or the predicted open time point, the control signal output means 5 acquires and sets the close control delay time and the open control delay time, respectively, for making, at a predetermined interpole voltage phase in the case of detecting the close command, and for opening, at a predetermined main circuit current phase in the case the open command is detected. Thereafter, the device is started. The close control signal or the open control signal is outputted immediately after a lapse of the close control delay time and the open control delay time. In the breaker 200, the making is conducted at the predetermined interpole voltage phase and opening is conducted at the predetermined main circuit current phase. Hereinbelow, operation of the control signal output means 5 will be described separately for close command detection and open command detection.

[I] Detection of Make Command

Figure 5:
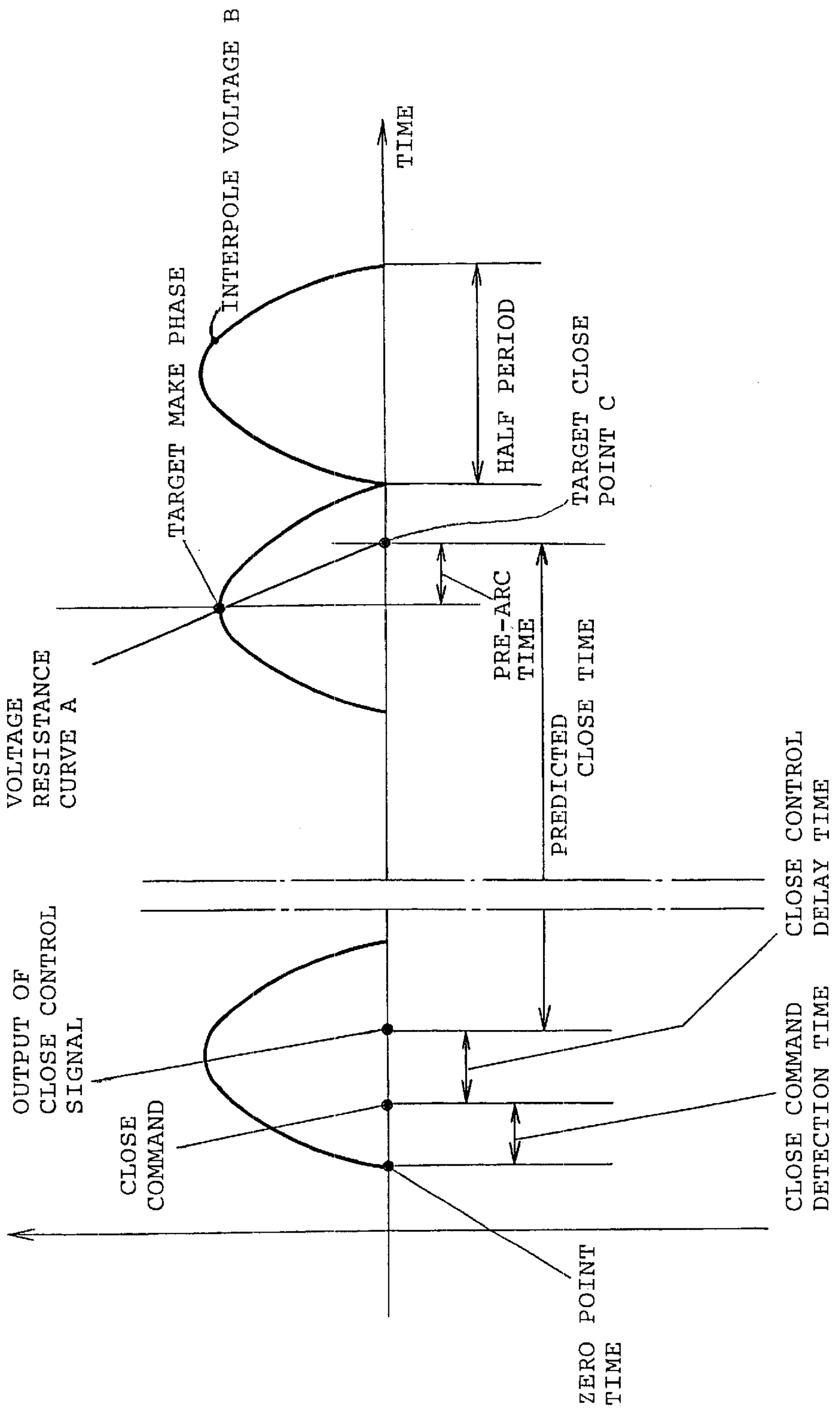
FIG. 5 is a time chart explaining a pre-arc time at time of closing a pole.

A difference between a make time point and a close time point, hereinbelow referred to as a pre-arc time, depends on an interpole voltage at the make time point. The pre-arc time is determined by a withstand curve A, stipulated by a traveling speed of the movable contact and an absolute value of a voltage wave form B of the interpole voltage, as shown in FIG. 5. Therefore, it is necessary to acquire the make time point by subtracting the pre-arc time, obtained from a relationship between the withstand curve A and the voltage waveform B, from the predicted close time, and to output the close control signal based on thus acquired make point in order to make the main circuit 100 at a predetermined interpole voltage phase.

FIG. 5 shows a case of making at an interpole voltage phase of 90°. An intersection between the withstand curve A and the interpole voltage waveform B is a target make timing, i.e., a generation time of a pre-arc. Delay from the generation time and a point C, where the contact is made, is the pre-arc time. Hereinbelow, delay from the reference zero point to the detection point of the close command is referred to as a close command detection time; delay from an interpole voltage zero point just before the make point is referred to as a half period make time; a time obtained by adding the pre-arc time to the half period make time is referred to as a half period close time; a time obtained by subtracting the half period close time from the predicted close time is referred to as a predicted close half period start time; and a time, obtained by dividing the predicted close half period start time by the half period, by referring to an integer part of the obtained quotient, by subtracting the predicted close half period start time from a product of the half period and (K+1), is referred to as a close command float time.

In the control signal output means 5, the close command detection time is acquired from the reference zero time point and the close command detection time point; the half period make time is acquired from a target make phase previously set; the pre-arc time is acquired from an interpole voltage at the target make phase; the half period close time is acquired from the half period make time and the pre-arc time; the predicted close half period start time is acquired from the predicted close time and the half period close time; and the close command float time is acquired from the half period and the predicted close half period start time. Because the pre-arc time depends on environmental conditions, such as an environmental temperature, a control voltage, a pressure of an insulating gas, and a traveling speed of the movable contact at the make time, the estimated reference close time may be corrected in a manner similar to the corrections based on the observed close time and the close time correction table.

The close control delay time, being a delay time until the close control signal is output, is acquired based on a relationship of magnitude between the close time detection time and the close command float time.

(1) When the close command detection time is smaller than the close command float time, a time obtained by subtracting the close command detection time from the close command float time, the close command detection time is set to a delay timer that is started to provide the close control delay time. The close control signal is output immediately after a lapse the close control delay time.

(2) When the close command detection time is larger than the close command float time, a time obtained by adding the half period to the close command float time and subsequently subtracting the close command detection time therefrom, is set to the delay timer as the close control delay time. Thereafter, the device is started. The close control signal is outputted immediately after a lapse of the close control delay time.

As described, the close control delay time does not exceed the half period. Further, the description is based on the assumption that the close command detection time, the half period make time, the pre-arc time, the half period close time, the predicted close half period start time, the close command float time, and so on were acquired by the control signal output means 5 after detecting the close command. However, it is possible to minimize delay of an output of the close control signal caused by a calculation time by acquiring the half period make time, the pre-arc time, the half period close time, and the predicted close half period start time in a half period preceding the detection of the close command; and, after detecting the close command, acquiring only the close command detection time; and, immediately thereafter, acquiring the close control delay time.

Although there has been described a process from the detection of the close command to the output of the close close command detection time, the half period make time, the half period close time, the predicted close half period start time, and the close command float time, the terminologies have been used for convenience in explaining the present invention. It is needless to say that a purpose of the present invention is to constantly detect the reference zero point time, to start the delay timer, which determines timing for outputting the close control signal immediately after the close command is detected, and to make at a predetermined phase of the interpole voltage with respect to the close operation of the breaker, and a structure realizing this purpose is included in the present invention.

In a case where mechanical scattering does not exist in the acting time of the breaker, it is preferable to make the target make phase 0°, when the making is by a capacitor bank, and 90°, when making is by a shunt reactor. However, practically there is a scattering in a mechanical operation. For example, in a case of making by the capacitor bank, because a making surge increases when an actual close time is shorter than predicted in comparison with an occasion when the actual close time is as much longer than predicted, it is possible to suppress a normal making surge by backward shifting the target make phase a little in response to the scattering of the mechanical operation.

As described, since the controlled switching device is constructed so as to constantly detect the reference zero point time and to start the delay timer, which determines the output timing of the close control signal immediately after detecting the close command, it is possible to output the close control signal within a half period after detecting the close command and to rapidly close the breaker 200.

[II] Detection of Open Command

In order to cut off the main circuit current so as not to generate an abnormal voltage caused by reignition or restrike in the main circuit 100, the open control signal is generated as follows for opening the pole at a main circuit current phase, i.e., a target open phase, by which the main circuit current is completely cut off after a lapse of a predetermined arc time. Hereinbelow, for convenience of explanation, delay from the reference zero time point to the detection time point of the open command is referred to as an open command detection time; a time obtained by subtracting an arc-time from the half period is referred to as a half period open time, which corresponds to the target open phase; a time obtained by subtracting the half period open time from the predicted open time is referred to as a predicted open half period start time; and a time obtained by dividing the predicted open half period start time by the half period, by referring to K as the integer part of the obtained quotient, and by subtracting the predicted open half period start time from a product of the half period and K+1, is referred to as an open command float time.

In the control signal output means 5, the open command detection time is acquired from the reference zero point and the open command detection time; the half period make time is acquired from the half period and a set arc-time; the predicted open half period start time is acquired from the predicted open time and the half period open time; and the open command float time is acquired from the half period and the predicted open half period start time.

The open control delay time, which is latency until the open control signal is outputted, is acquired based on a relationship of magnitude between the open command detection time and the open command float time.

(1) When the open command detection time is smaller than the open command float time, a time obtained by subtracting the open command detection time from the open command float time is set to a delay timer as the open control delay time, and the controlled switching device is started. The open control signal is outputted immediately after a lapse of the open control delay time.

(2) When the open command detection time is larger than the open command float time, a time obtained by adding the half period to the open command float time and by subtracting the open command detection time therefrom is set to the delay timer as the open control delay time, and the controlled switching device is started. The open control signal is outputted immediately after a lapse of the open control delay time.

As described, the open control delay time does not exceed the half period. Although the description is based on a proposition that the open command detection time, the half period open time, the predicted open half period start time, the open command float time, and so on were acquired by the control signal output means 5 after detecting the open command, it is possible to minimize a delay of the starting of the open operation, caused by calculation by constructing the controlled switching device so that the half period open time and the predicted open half period start time are previously acquired and, after detecting the open command, only the open control delay time is acquired immediately after acquiring only the open command detection time.

Although there has been described the process from the detection of the open command to the output of the open control signal in use of the terminologies such as the open command detection time, the half period open time, the predicted open half period start time, and the open command float time, these were used for convenience of explanation. A purpose of the present invention concerning the open operation of the breaker is to construct the controlled switching device so that the reference zero time point is constantly detected; and a delay timer for immediately determining output timing of the open control signal after detecting the open command is started so that the pole is opened at a predetermined phase of the main circuit current; and a structure achieving this purpose is included in the present invention.

Embodiment 2

Figure 6:
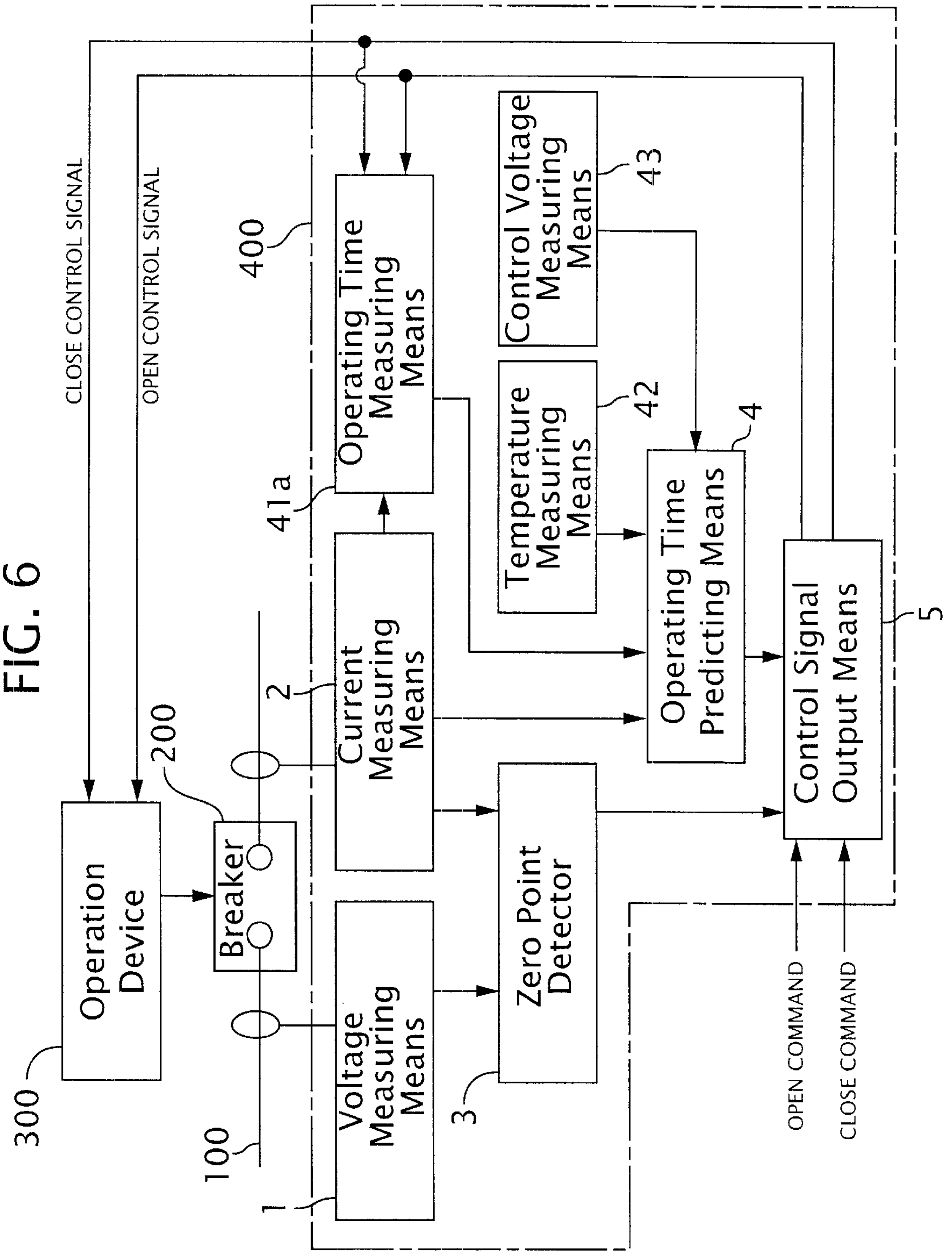
FIG. 6 is a block diagram of a controlled switching device according to Embodiment 2 of the present invention.

FIG. 6 is a block diagram of a controlled switching device according to Embodiment 2 of the present invention. Instead of the acting time measuring means 41 illustrated in FIG. 1, an operating time measuring means 41*a*, which acquires the observation close time from a rise time point of a current signal at a time of closing, i.e., a start time of pre-arc, acquired by a main circuit current measuring means 2, and from a close control signal, is used.

Figure 7:
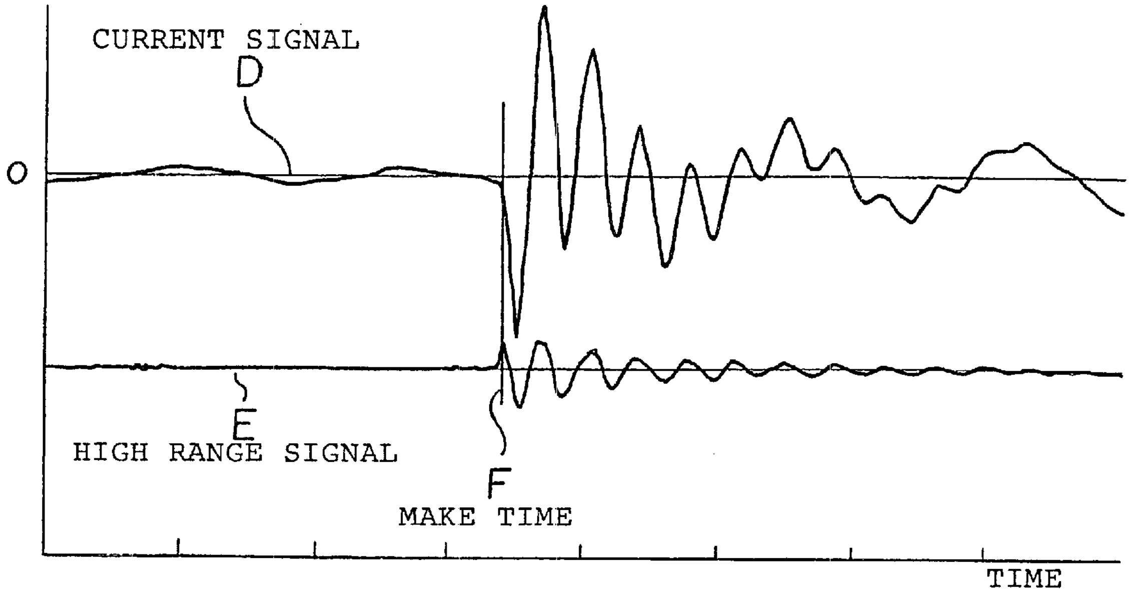
FIG. 7 is a time chart explaining a method for detecting a make time by a current signal.

A structure of the acting time measuring means 41 a will be described. At a time of a close operation, a current signal D, illustrated in FIG. 7, is acquired from the main circuit current measuring means 2 at a time of closing the pole. Because a discontinuous portion occurs in the current signal D at a make time F, the make time F is detected as the start time of the pre-arc. At first, only a high-frequency component of the current signal D is removed by a high-pass filter. The high-pass filter may include a digital filter for processing and calculating the current signal D, or by an analog filter for processing an analog signal from a power transformer (PT) and an A/D converter for sequentially digitizing the analog signal at predetermined sampling intervals. By previously setting a positive threshold value and a negative threshold value for an obtained high level signal E, a time when a value of the high level signal exceeds the threshold value can be determined using an output time of the close control signal. When the value exceeds the positive threshold value at first, a positive local peak point is further acquired and a time thereof is rendered to be the make time F. The positive local peak point designates a point n, at which $E_{(n-1)} \geqq E_{(n)}$ and $E_{(n)} \geqq E_{(n-1)}$ are established when three sequential voltage signal values of $E_{(n-1)}$, $E_{(n)}$, $E_{(n+1)}$ exist. Similarly, when the value exceeds the negative threshold value at first, a negative local peak time is further acquired and the time thereof is rendered to be the make time F. The negative local peak point designates a point n, at which $E_{(n-1)} \geqq E_{(n)}$ and $E_{(n)} \geqq E_{(n+1)}$ are established when there are three sequential signals $E_{(n-1)}$, $E_{(n)}$ and $E_{(n+1)}$. An observation close time is acquired such that delay between the output time of the close control signal and the make time acquired as in the above is added to the pre-arc time, provided that the delay is acquired by subtracting the pre-arc time from the observation close time.

Because the pre-arc time differs depending on a phase of the interpole voltage at time of making, it is necessary to acquire the interpole voltage phase at the time of making depending on a difference of thus acquired observation close time and the predicted close time and to acquire an effective pre-arc time at time of closing. According to this method, it is possible to measure the observation close time without using an auxiliary switch and other measuring means.

Embodiment 3

Figure 8:
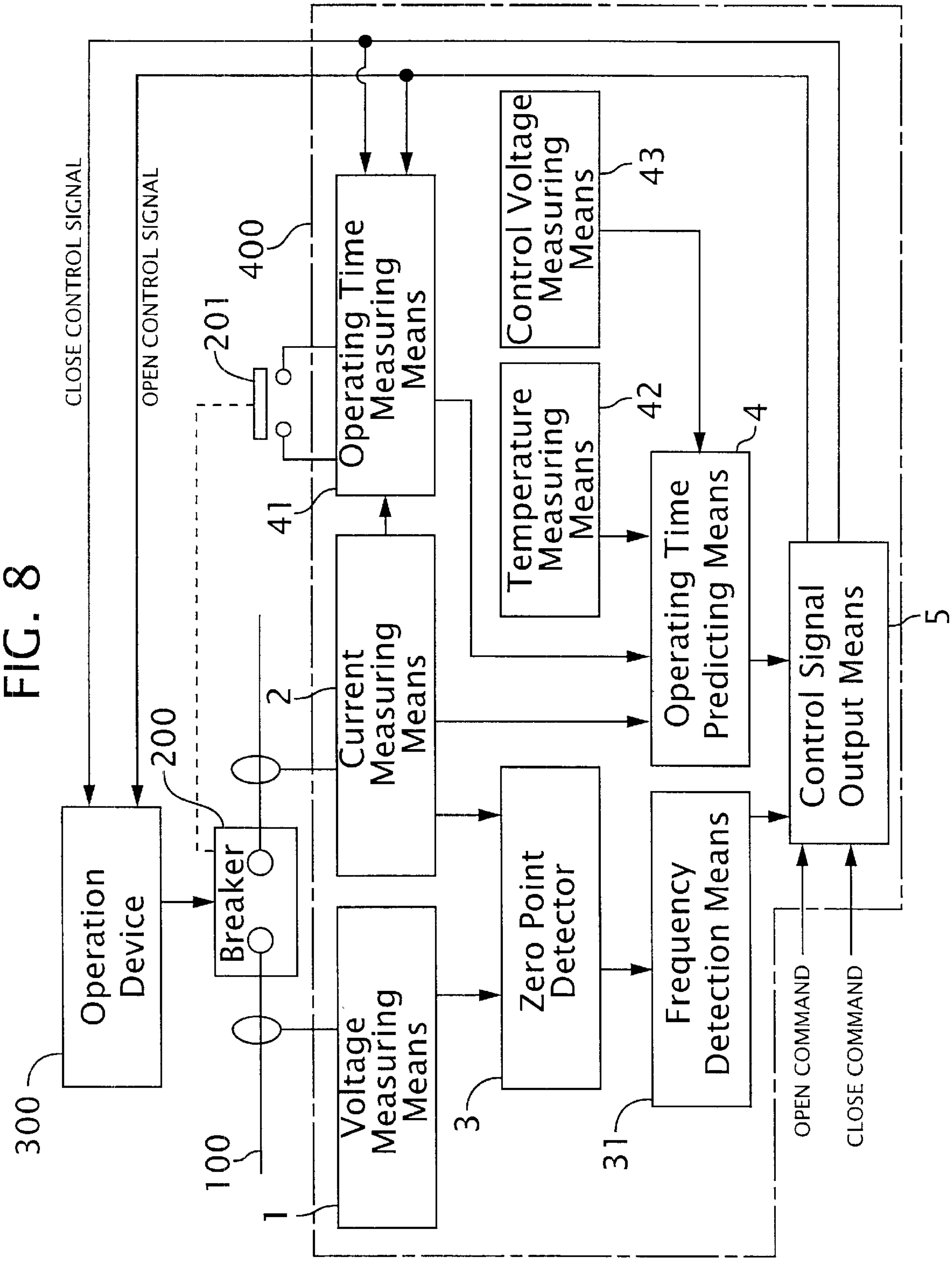
FIG. 8 is a block diagram of a controlled switching device according to Embodiment 3 of the present invention.

FIG. 8 is a block chart of a power make break switch according to Embodiment 3 of the present invention. A frequency detection means 31 for detecting frequencies of an interpole voltage and of a main circuit current from a reference zero point time, acquired by a zero point detection means 3, is provided in the controlled switching device illustrated in FIG. 1, and a half period, which is basic information used in a control signal output means 5, is set based on the frequencies acquired by the frequency detection means 31.

A structure of the frequency detection means 31 will be described. Because the frequency detection means 31 can be applied to both of the interpole voltage and the main circuit current, the frequency detection means 31 is not separately described with respect to the interpole voltage and the main circuit current.

Provided that two sequential reference zero points are $t_1$ and $t_2$, frequency at that time becomes $1/(t_1-t_2)$. Frequencies are calculated for each reference zero point. An average of n continuous frequencies, for example, values measured one hundred times, is rendered as a reference frequency, and a half period of the reference frequency is acquired. Although the frequency does not abruptly vary, there is a case where a waveform hunts, so an upper limit and a lower limit of the frequency are previously set in response to a system, and when the acquired reference frequency deviates outside of the range limited by the upper limit and the lower limit, the deviated value is omitted.

Although embodiments of the present invention have been described on a premise that the breaker 200 is a single phase, it is needless to say that the above structure is applicable to a controlled switching device with three-phase individual operation by providing the above structure for each of the phases.

The first advantage of the controlled switching device according to the present invention is that the close control signal is output after a wait time within a half period from detection of the close command, and it is possible to make at the target phase.

The second advantage of the controlled switching device according to the present invention is that the zero time point to be detected becomes more accurate and an error of the interpole voltage phase at a time of making from the target phase becomes smaller.

The third advantage of the controlled switching device according to the present invention is that an error of the interpole voltage phase at a time of making from the target phase can be further reduced, which error is caused by a variation of the environmental condition.

The fourth advantage of the controlled switching device according to the present invention is that an error, which is caused by age deterioration, of the interpole voltage phase at a time of making from the target phase can be further reduced.

The fifth advantage of the controlled switching device according to the present invention is that the predicted close time can be further accurately corrected.

The sixth advantage of the controlled switching device according to the present invention is that various time information, being a reference at a time of closing, becomes more accurate, and an error of the interpole voltage phase at a time of making from the target phase can be further reduced.

The seventh advantage of the controlled switching device according to the present invention is that the open control signal is output after a wait time within a half period from detection of the open command, and it is possible to open the pole at the target phase.

The eighth advantage of the controlled switching device according to the present invention is that the zero time point to be detected becomes more accurate, and an error of the main circuit current phase at a time of opening the pole from the target phase can be further reduced.

The ninth advantage of the controlled switching device according to the present invention is that an error, which is caused by a variation of environmental conditions, of the main circuit current phase at a time of opening the pole from the target phase can be further reduced.

The tenth advantage of the controlled switching device according to the present invention is that an error, which is caused by age deterioration, of the main circuit current phase at a time of opening the pole from the target phase can be further reduced.

The eleventh advantage of the controlled switching device according to the present invention is that various time information, being a reference at a time of opening the pole, becomes more accurate, and an error in the main circuit current phase at the time of opening the pole from the target phase can be further reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A controlled switching device for making a breaker at a target make phase of an AC interpole voltage applied across poles of the breaker, the device comprising:

interpole voltage measuring means for measuring an AC interpole voltage applied across poles of a breaker when open;

zero time point detection means for detecting and storing in a memory, over time, a plurality of interpole voltage zero time points when the interpole voltage is instantaneously zero, based on measured interpole voltage; and control means for output of a close control signal; predicting a predicted close time of the poles, measured from the output of the close control signal to actual closing of the poles, at a target close point; determining a close command detection time, measured from the interpole voltage zero time point preceding and closest in time to a close command to receipt of the close command; obtaining a pre-arc time measured from a target make phase to the actual closing at the target close point; determining a close control delay time, from receipt of the close command until issuance of the close command signal, within one-half period of the interpole voltage; and outputting the close control signal after lapse of the close control delay time so that the making is completed at the target make phase.

2. The controlled switching device according to claim 1, wherein said control means continuously evaluates the zero time points a number of times preceding and closest in time to receipt of the close command, and minimizes deviations with respect to each of the zero time points evaluated, from a product of one-half period of the interpole voltage and an integer; and selects the zero time point from times with the minimum sum of absolute values of the deviations just before the receipt of the close command and closest in time to the receipt of the close command.

3. The controlled switching device according to claim 1, wherein said control means predicts the predicted close time by correcting a reference close time based on a reference environmental condition and a measured environmental condition by consulting a close time correction table for the environmental condition.

4. The controlled switching device according to claim 1, wherein said control means includes:

close time detection means for detecting time of closing of the switch poles; and operating time measuring means for acquiring an observed close time from the close control signal until closing of the switch poles; and said control means corrects its reference close time based on a measured environmental condition by consulting a close time correction table based on the environmental condition.

5. The controlled switching device according to claim 1, wherein said control means detects a rise time of a main circuit current flowing at closing of the poles and including operating time measuring means acquiring an observed close time by adding the pre-arc time to the delay from the output of the close control signal until the rise time of the main circuit current, and wherein said control means corrects a reference close time corrected based on a measured environmental condition by consulting a close time correction table based on the environmental condition.

6. The controlled switching device according to claim 1, wherein said control means uses a fixed number of continuous zero time points preceding and closest in time to receipt of the close command, acquires local frequencies of the interpole voltage from delays between adjacent zero time points, and determines a frequency of the interpole voltage as an average of the local frequencies.

7. A controlled switching device for breaking a breaker actuated at a target open phase of an AC main circuit current flowing through the poles of the breaker, the device comprising:

main circuit current measuring means for measuring an AC main circuit current flowing through poles of a breaker when closed;

zero time point detection means for detecting and storing in a memory, over time, a plurality of interpole current zero time points when current flowing through the breaker is instantaneously zero, based on measured main circuit current; and control means for output of an open control signal; predicting a predicted open time of the poles, measured from the output of the open control signal to actual opening of the poles at the target phase; determining an open command detection time, measured from the main circuit current zero time point preceding and closest in time to an open command to receipt of the open command; determining an open control delay time within one-half period of the main circuit current; and outputting the open control signal after a lapse of the open command detection time and the open control delay time so that circuit breaking is completed at the target open phase.

8. The controlled switching device according to claim 7, wherein said control means continuously evaluates the zero time points a number of times preceding and closest in time to receipt of the open command, minimizes deviations with respect to each of the zero time points evaluated, from a product of one-half period of the main circuit current and an integer, and selects the main circuit current zero time point is from times with the minimum sum of absolute values of the deviations just before receipt of the open command and closest in time to the receipt of the open command.

9. The controlled switching device according to of claim 7, wherein said control means predicts the predicted open time by correcting a reference open time based on a reference environmental condition and a measured environmental condition and consulting an open time correction table for the environmental condition.

10. The controlled switching device according to claim 7, wherein said control means includes:

open time detection means detecting time of opening of the switch poles, and operating time measuring means for acquiring an observed open time from the open time and output of the open control signal, and said control means corrects a reference open time for a measured environmental condition by consulting an open time correction table based on the environmental condition.

11. The controlled switching device according to claim 7, wherein said control means uses a fixed number of continuous main circuit current zero time points preceding and closest in time to receipt of the open command, acquires local frequencies of the main circuit current from delays between adjacent main circuit current zero time points, and determines a frequency of the main circuit current of the breaker as an average of the local frequencies.

* * * * *